United States Patent Office 3,227,567
Patented Jan. 4, 1966

3,227,567
PHOSPHATE BONDED BASIC REFRACTORY
ARTICLES
Howard M. Dess, Niagara Falls, N.Y., assignor to Union
Carbide Corporation, a corporation of New York
No Drawing. Filed May 18, 1962, Ser. No. 195,993
1 Claim. (Cl. 106—59)

The present invention relates to chemically bonded basic refractory bricks and more particularly to phosphate bonded basic refractory bricks.

In the manufacture of basic refractories for the steel industry, two main types of products are used which are known generally as burned bricks and chemically bonded bricks. These bricks while mainly used for the construction of open hearth furnaces, are also used in electric furnaces, ladle linings, and the like.

Burned bricks are produced by pressing suitably sized, basic refractory grain mixtures containing 2 to 3 percent of some inexpensive organic bonding agent and then firing the pressed shapes at temperatures ranging from about 1400 to 1600° C. Adhesive organic materials, such as starches, sugars, or waste lignin sulfite, are typically used as the bonding agent and are applied as concentrated aqueous solutions.

With chemically bonded bricks, the bonding agent for the grain mixture is an inorganic substance such as magnesium sulfate, magnesium chloride, magnesium chromate, chromic acid, or other suitable inorganic compounds which are soluble in water and which provide bonding by the precipitation of a dense interlocking network of fine crystalline material from a concentrated aqueous solution.

Chemically bonded bricks are not fired prior to installation and depend upon the first heat of the furnace to form a suitable sintered layer at the hot face. At the elevated temperatures involved in furnace operation, the chemical bond is decomposed and is believed to be absorbed by the surrounding refractory grains during the sintering process. Thus, the inorganic residue that is left after firing becomes incorporated into the sintered grain structure. By way of contrast, the organic bonds of burned bricks burn out completely at much lower temperatures and usually contribute nothing to the final sintered structure of the product.

Some of the advantages that have been cited for the chemically bonded bricks as compared with the burned bricks are lower thermal conductivity, lower porosity in the unburned state, and a degree of pyroplasticity at elevated temperatures that permits stress relief. These advantages may be all related in some way to the overall observation that chemically bonded bricks are less subject to sheet spalling than burned bricks.

On the debit side, however, probably the most serious problem with chemically bonded bricks is that they develop weak zones in the interior.

In operation, the situation is as follows: With a chemically bonded brick in a furnace wall, the hot face is well within the sintering range while the outer face is cool enough so that the original chemical bond is still largely intact. However, there is a region interior the brick which is hot enough so that the chemical bond is destroyed or badly weakened but not hot enough for sintering to occur. The refractory grains in this intermediate temperature zone are therefore held together mainly by mechanical interlocking and consequently this region of the brick is quite weak and prone to failure. This highly undesirable weakening of the chemical bond is mainly caused by dehydration of the original cementitous material which was deposited as a hydrate from aqueous solution.

As a means of overcoming this problem, external steel cladding has been widely adopted as a means of strengthening chemically bonded bricks, and internal steel plates are also used by a number of manufacturers. However, the use of this cladding technique or the introduction of iron plates into the interior of the brick causes other problems associated with the formation of iron oxide rich zones in the brick that are almost equally undesirable.

Also, much research has been done in recent years in an attempt to overcome the drop in strength of the chemical bond in the intermediate temperature zone without the use of plates or cladding. However, up to the present, no completely satisfactory solution has yet been found with the ordinary types of bonding agents previously mentioned. Further, based on present knowledge, the chances appear slight that any substantial improvements can be made that would raise the previously used magnesium sulfate or magnesium chromate chemical bonding systems much above the present performance levels.

However, since chemically bonded bricks are advantageous in many respects as compared to burned bricks, it would be of considerable benefit if a chemically bonded brick would be provided having increased strength at all temperatures encountered during normal furnace operation.

It is therefore an object of the present invention to provide a high quality chemically bonded brick having increased strength throughout the range of temperatures encountered in open hearth furnaces and similar operations.

Other objects will be apparent from the following description and claim.

A chemically bonded basic refractory brick and like article in accordance with the present invention comprises a refractory mass formed by compressing a mixture of acid coated basic refractory particles with a concentrated acid phosphate bonding solution.

In a particular embodiment of the present invention, a refractory brick or like article is produced by contacting particles of basic refractory material with concentrated sulfuric acid to provide the particles with an acid sulfate coating; mixing the acid sulfate coated particles with concentrated phosphoric acid; and compacting the mix into shapes suitable for use in furnace construction.

In the practice of the above-described and all other embodiments of the present invention, the particulated basic refractory material can be any refractory material suitable for use in the manufacture of basic refractory bricks. Such materials include chrome ore, magnesite, periclase, burned or fused dolomite, dead burned lime, mixtures of chrome ore and magnesia, and particles derived from crushed fused mixtures of chrome ore and magnesia. When mixtures of chrome ore and magnesia are used, the preferred proportion of magnesia ranges from 50 percent to 80 percent.

As regards the sulfuric acid treatment of the basic refractory particles, it is important that the sulfuric acid employed have a concentration of between about 70 and 98 percent and that the amount of acid used be between about 1 and 6 percent of the weight of the refractory material being treated. It has been found that if the acid concentration or amount is less than that specified, the subesquent reaction of the basic refractory material with phosphoric acid is excessively rapid and the manufacture of articles such as bricks and the like cannot be satisfactorily accomplished. If a greater amount of sulfuric acid is employed, it as been found that the bricks and like articles ultimately produced from the thus treated material have a tendency to crack during use and are otherwise undesirable.

The manner of contacting the particles of basic refractory material with the concentrated sulfuric acid is important in the present invention since it is necessary that substantially all of the basic refractory particles be provided with a substantially complete acid sulfate coating or shell before subsequent mixing and processing with phosphoric acid. If such a coating is not provided, the reaction between the phosphoric acid and basic refractory material will be so rapid as to make impossible the proper mixing and pressing necessary for the manufacture of bricks and the like.

It is also important in the manufacture of bricks and like articles in accordance with the present invention that the sulfuric acid be applied in a manner which avoids agglomeration of the refractory particles since agglomerated particles do not receive the proper coating and the properties of the bricks ultimately produced are adversely affected. In this regard, contacting the particles with a fine spray of sulfuric acid is preferred; the addition of sulfuric acid by pouring or sprinkling with large drops is to be avoided. The acid sulfate coating required in the present invention can be provided by spraying the concentrated sulfuric acid on the refractory particles using a device such a DeVilbiss compressive air sprayer.

It has also been found that agitation of the refractory particles during the sulfate coating procedure is necessary to prevent the treated particles from sticking together, and in order to expose fresh surface to incoming spray droplets in a continuous and rapid fashion to provide the required acid coating on the particles. In this regard, the agitation is continued until the particles no longer appear wet and no longer have a tendency to agglomerate. When this condition has been reached, the refractory material is acid sulfate-coated in accordance with this invention and is free-flowing, easily handled, and can be stored for long periods, up to weeks if kept dry.

Immediately after the aforedescribed coating treatment the refractory particles are quite warm due to heat developed by the reaction of sulfuric acid with the refractory material. Consequently, the acid sulfate coated refractory material is allowed to cool before being further processed so that the reactions involved will not be inconveniently rapid. In this respect it is important, before the treatment with phosphoric acid, that the sulfate coated material be at a temperature below about 40° C. and preferably below 30° C.

When the sulfate coated refractory particles have been cooled to a proper temperature, as aforementioned, a mix or raw batch comprising the acid sulfate coated refractory particles and concentrated phosphoric acid is prepared.

It is important that the concentration of the phosphoric acid employed in the mixing step be quite high, i.e. between about 50 percent and 95 percent, preferably between 75 and 95 percent, and that the amount of phosphoric acid used be between about 1 and 8 percent of the weight of the acid sulfate coated refractory material in the mixture.

It has been found that if the concentration of the phosphoric acid is below about 50 percent the reaction with the acid sulfate coated material is excessively rapid and the manufacture of articles such as bricks and the like cannot be satisfactorily accomplished due to the very rapid hardening of the mixture.

If the amount of concentrated phosphoric acid in the mixture is greater than about 8 percent, the bricks ultimately produced from the mixture have a tendency to crack in use and have other undesirable characteristics. On the other hand, when amounts of phosphoric acid less than about 1.0 percent are used, satisfactory bonding between the refractory particles is generally not obtained.

In preparing the mix, the concentrated phosphoric acid can be added to the acid sulfate coated particles in any convenient manner, it being necessary only to ensure that a substantially homogeneous mixture be provided. The mix of concentrated phosphoric acid and sulfate coated refractory particles prepared in the manner aforedescribed is initially plastic and remains in this condition for at least several hours and usually for as long as 24 hours or more.

When a plastic mix of phosphoric acid and acid sulfate coated refractory particles has been prepared in accordance with this invention, the resulting material can be pressed or otherwise formed into bricks or the like in the usual manner and by conventional techniques. In general, it is best to press bricks from the plastic mix within about 2 to 3 hours of its formation in order to achieve optimum properties in the final article. However, pressing can be delayed for longer periods and highly satisfactory results are obtained so long as the mix is plastic.

Ordinarily, a mix having a relatively long working life is desired and under these circumstances the higher concentrations of phosphoric acid are used. However, if rapid settling is desired, for example where the mix is to be used for patching, using a gun or similar device, lower concentrations of phosphoric acid are used.

The phosphate bonded bricks produced in this manner are characterized by high strength and can be handled and transported routinely. Moreover, when used in open hearth furnace construction, these bricks have superior high temperature properties as compared to other chemically bonded bricks. Further, the strength of phosphate bonded bricks of this invention is substantially greater than that of other chemically bonded bricks in the temperature range of 25° F. to 1400° F. The strength of the present phosphate bonded bricks is at least equal to that of other chemically bonded bricks at the other temperatures encountered in open hearth furnace operation.

The following examples are provided to further illustrate the present invention.

EXAMPLE I

A fused mixture of 40 percent chrome ore and 60 percent low calcined "caustic" sea water magnesia was prepared and subsequently was crushed to a particle size distribution providing the highest bulk density.

The crushed material was introduced into a laboratory cement mixer apparatus and the particles were agitated and concurrently sprayed by means of a compressed air sprayer with 98 percent sulfuric acid. The total amount of acid sprayed on the particles was 4 percent of the weight of the particles.

The material in the mixer was continuously agitated during spraying, and agitation was continued until the particles appeared dry and no longer tended to stick together. In this condition the particles were acid sulfate coated.

The sulfuric acid treated particles were permitted to cool in the mixer to a temperature of about 30° C.

Phosphoric acid amounting to 4 percent of the weight of the acir sulfate coated particles and having a concentration of 86 percent was then sprinkled into the material in the mixer and the material was agitated to thoroughly mix the acid and the acid sulfate coated particles.

The phosphoric acid-containing mix was subsequently removed from the mixer and pressed in a steel die at a pressure of 10,000 p.s.i. to provide a brick 9 inches x 4½ inches x 2½ inches. The brick was air aged overnight and dried at about 100° C. to 110° C. to ensure completion of the phosphate bonding reaction between the acid and basic material in the particles.

The brick thus obtained was strong and of good appearance and exhibited superior spalling resistance under conditions encountered in open hearth furnace operations. The brick also had superior strength in the temperature range of 25° C. to 1300° C.

EXAMPLE II

In order to determine the effect of the use of different amounts of acid on the aging properties of wet mixes prepared in accordance with this invention, separate portions of the crushed basic refractory material of Example I were reacted with various amounts of phosphoric and sulfuric acid. The acid concentrations and the manner of treating the refractory particles were the same as in Example I.

In the present example, cylindrical pellets having ⅞ inch diameter and 1 inch in length were pressed from the wet mixes at different intervals after formation of the mix and the compressive strength of the pellets was measured to provide an indication of the effect of aging on the strength of the pellets. All pellets were formed by pressing at 16,600 p.s.i. The compressive strengths of the pellets for various amounts of acid and for different pressing intervals are shown in Table I.

*Table I*

| Amount of Acid Used in Treatment, Percent | | Compressive Strengths of Pellets Formed at Different Intervals [1] after Formation of Mix | | | | |
| --- | --- | --- | --- | --- | --- | --- |
| $H_2SO_4$ (98%) | $H_3PO_4$ (86-87%) | 10 | 30 | 1 hr. | 2 hr. | 3 hr. |
| 4 | 4 | 10,200 | 9,800 | 6,500 | 7,200 | 9,800 |
| 4 | 6 | 12,500 | 12,500 | 15,000 | 12,500 | 14,500 |
| 6 | 4 | 10,200 | 10,700 | 11,200 | 8,800 | 10,200 |
| 6 | 6 | 13,300 | 16,500 | 16,000 | 16,500 | 14,500 |

[1] Measured as elapsed time after substantially complete mixing of $H_3PO_4$ and sulfate coated particles is obtained.

It can be seen from the foregoing data that delays of up to 3 hours before pressing do not significantly affect the strength of the pressed articles.

EXAMPLE III

The procedure of Example II was repeated using 6 percent of sulfuric acid (98% conc.) and 4 percent of phosphoric acid in all instances. In this example the concentration of the phosphoric acid was varied to determine its effect on the aging properties of the mix. The results are shown in Table II.

*Table II*

| Concentration of Acid Used in Treatment, Percent | | Compressive Strength of Pellets Formed at Different Intervals [1] after Formation of Mix | | | | |
| --- | --- | --- | --- | --- | --- | --- |
| $H_2SO_4$ | $H_3PO_4$ | 10 | 30 | 1 hr. | 2 hr. | 3 hr. |
| 98 | 95 | 12,700 | 10,700 | 11,700 | 14,000 | 14,000 |
| 98 | 86 | 10,200 | 10,700 | 11,100 | 8,900 | 10,200 |
| 98 | 65 | 12,000 | 9,200 | 8,400 | 6,300 | 6,100 |

[1] Measured as elapsed time after substantially complete mixing of $H_3PO_4$ and sulfate coated particles is obtained.

The foregoing data indicates that the aging properties of the mix improve with the use of higher concentrations of phosphoric acid.

EXAMPLE IV

The procedure of Example II was repeated using 98 percent conc. sulfuric acid and 86 percent conc. phosphoric acid in all instances. In this example the amounts of sulfuric acid and phosphoric acid were varied and all pellets were pressed at an aging time of 10 minutes. The pellets were heated to various elevated temperatures after which the compressive strengths were measured at room temperature. The results are set forth in Table III.

*Table III*

| Amount of Acid Used in Treatment, Percent | | Compressive Strength of Pellets after Heating to Indicated Temperatures [1] | | | |
| --- | --- | --- | --- | --- | --- |
| $H_2SO_4$ (98%) | $H_3PO_4$ (86%) | 100° C. | 800° C. | 1,100° C. | 1,400° C. |
| 4 | 4 | 10,200 | 11,700 | 7,600 | 9,500 |
| 4 | 6 | 12,500 | 18,300 | 13,000 | 12,500 |
| 6 | 4 | 10,200 | 11,700 | 7,000 | 6,700 |
| 6 | 6 | 13,200 | 11,700 | 7,700 | 7,400 |

[1] Measured at room temperature.

While the foregoing description has been directed specifically to the use of concentrated sulfuric acid for acid coating particles of basic refractory material and concentrated phosphoric acid as the bonding agent, other materials can be used in the manner aforedescribed to provide substantially equivalent results. For example, concentrated solutions of acid phosphates can be used in place of phosphoric acid as the bonding agent and in some instances concentrated phosphoric acid can be used for acid coating the basic refractory material.

In general, the concentrated acid used for acid coating the refractory material must be at least of equal strength and have at least as high a boiling point as the parent acid of the bonding solution.

Specific combinations of acid coating materials and bonding agents within the scope of the present invention are shown in Table IV.

*Table IV*

| Acid Coating Material | Bonding Agent Solution |
| --- | --- |
| Conc. $H_2SO_4$ | Conc. $H_3PO_4$. |
| Conc. $H_3PO_4$ | Conc. $H_3PO_4$. |
| Conc. $H_2SO_4$ | Concentrated Solutions of $NH_4^+$, $Mg^{++}$, $Al^{+++}$, $Fe^{++}$, $Fe^{+++}$ and $Cr^{+++}$ acid phosphates. |
| Conc. $H_3PO_4$ | Concentrated Solutions of $NH_4^+$, $Mg^{++}$, $Al^{+++}$, $Fe^{++}$, $Fe^{+++}$, and $Cr^{+++}$ acid phosphates. |

In general, the concentrations and amounts of the acid coating material and bonding agent solution and the method of applying these materials should be as described in connection with the sulfuric acid-phosphoric acid embodiment of this invention. However, in order to obtain optimum bonding, the concentrations and amounts of the materials, particularly of the bonding solution, may vary somewhat with the different bonding agents employed.

As can be seen from the foregoing Table I, a variety of combinations of materials can be used in the practice of the present invention including concentrated phosphoric acid for both the acid coating and bonding agent. The fact that the use of concentrated phosphoric acid alone can be used to provide a mix having a long working life which can be used in the manufacture of refractory articles such as bricks and the like having superior high temperature properties is considered to be an important feature of this invention.

As to the bonding agents other than phosphoric acid which can be used, in general all acid phosphates having significant solubility in water can be used, however those containing $Na^+$ and $Ca^{++}$ as secondary cations are to be avoided inasmuch as the refractoriness of the final product is adversely affected by these materials.

As can be seen from the foregoing description, an important advantage of the present invention is that by acid coating basic refractory material, the subsequent reaction with acid phosphate bonding material is slowed down so that phosphate bonded bricks and other refractory shapes having superior properties can be conveniently produced. Without intending to limit the invention or being bound by the explanation, the following hypothesis directed to a particular embodiment of this invention is believed to describe this phenomena:

Basic refractory material contains magnesia in a form which reacts initially in a very rapid manner with the applied concentrated sulfuric acid to form magnesium sulfate and/or magnesium acid sulfate as a coating on the surface of the individual basic refractory particles. These coatings tend to hinder further reaction of the sulfuric acid which either remains entrapped physically in the surface coatings or is present in the form of acid sulfates. In any event, it has been established that the coating on the air-dried grain is definitely acidic. For example, the pH of a water slurry of particles of a fused 40/60-chrome ore/magnesite mixture was between 10 and 11. The initial pH of a water slurry of the same material after sulfuric acid coating treatment was between 1.9 and 2.5.

When concentrated phosphoric acid or acid phosphate solution is added to the uncoated basic refractory particles, i.e. untreated with sulfuric acid, the reaction is extremely rapid and exothermic and yields various magnesium phosphates. Consequently, the reaction proceeds so quickly that there is insufficient time for proper mixing or pressing.

With the $H_2SO_4$ treated acid coated material, however, the following equilibrium reaction is hypothesized as the first step:

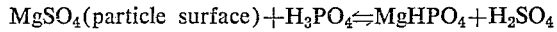

The equilibrium lies predominantly on the left side of this equation because $H_2SO_4$ is a stronger acid than $H_3PO_4$. Bonding occurs as a result of further reaction of these acids with the underlying magnesia substrate. The rate of this reaction is limited, however, by the presence of the protective coating of $MgSO_4$ formed during the precoating. Thus, in unpressed mixes, the charge stays moist and workable for hours. With subsequent pressing, however, bonding rapidly occurs since the corners and edges of the refractory particles, forced in close contact with each other, tend to cut through the protective $MgSO_4$ coating, thereby exposing fresh magnesia surface and permitting the following bonding reactions to rapidly take place:

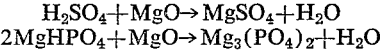

As the phosphoric acid is used up, the liquid phase disappears and the solid reaction products are obtained as new crystalline phases (possibly gelatinous initially) in intimate contact with the basic refractory particle surfaces and serve to cement together the refractory particles.

From the foregoing description it can be seen that the present invention constitutes a substantial industrial benefit by providing a convenient method for producing phosphate bonded basic refractory bricks which have superior strength in the as-produced or over-dried state and at temperatures up to the sintering temperature of the basic brick material.

What is claimed is:

A process for manufacturing phosphate bonded basic refractory bricks and like articles which comprises contacting particles of basic refractory material with a concentrated sulfuric acid solution to provide the particles with an acid sulfate coating, said basic refractory material being in the form of a fused mixture of chrome ore and magnesia containing 50 to 80 percent magnesia and said sulfuric acid having a concentration of between about 70 and about 98 percent and the amount of said sulfuric acid being between about 1 and about 6 percent of the refractory material; mixing the acid sulfate coated particles with a concentrated phosphoric acid solution, the concentration of said phosphoric acid solution being between about 50 and about 95 percent and the amount of said phosphoric acid solution being between about 1 and about 8 percent of the acid sulfate coated refractory material; and compressing the mix into a suitable refractory shape.

References Cited by the Examiner

UNITED STATES PATENTS 2,852,401   9/1958   Hansen et al. _____ 106—66

FOREIGN PATENTS 520,829   5/1940   Great Britain.

TOBIAS E. LEVOW, *Primary Examiner.*